United States Patent [19]

Hah

[11] Patent Number: 5,433,535
[45] Date of Patent: Jul. 18, 1995

[54] SELF-ALIGNING LOCATING TYPE ROLLER BEARING

[75] Inventor: Hong S. Hah, Incheon, Rep. of Korea

[73] Assignee: Seok Tae Yoon, Seoul, Rep. of Korea

[21] Appl. No.: 223,751

[22] Filed: Apr. 6, 1994

[51] Int. Cl.⁶ ............................................. F16C 33/58
[52] U.S. Cl. ..................................... 384/564; 384/584
[58] Field of Search ............... 384/564, 508, 560, 584, 384/569, 559

[56] References Cited

U.S. PATENT DOCUMENTS

| | | | |
|---|---|---|---|
| 3,733,109 | 5/1973 | Hallerback | 384/564 |
| 4,568,205 | 2/1986 | Basener | 384/508 |
| 4,787,758 | 11/1988 | Jacob | 384/564 |
| 5,054,937 | 10/1991 | Hanaway | 384/508 |

FOREIGN PATENT DOCUMENTS 4427081 8/1965 Japan .
4627362 2/1967 Japan .

*Primary Examiner*—Lenard A. Footland
*Attorney, Agent, or Firm*—James Creighton Wray

[57] ABSTRACT

A self-aligning Locating type roller bearing is disclosed, and the bearing includes an outer shell, an outer race, an inner race, and a plurality of rollers disposed between the outer race and the inner race. The inner race is provided with two integral collars, and a part of one of the collars is cut out form a roller insertion slot. The rollers are assembled through the roller insertion slot, and, after the completion of the assembling of the rollers, the roller insertion slot is closed with a block. Thus the assembling of the rollers is facilitated, and the collars firmly support the rollers, resulting in that the bearing is capable of withstanding a heavy axial load.

3 Claims, 2 Drawing Sheets

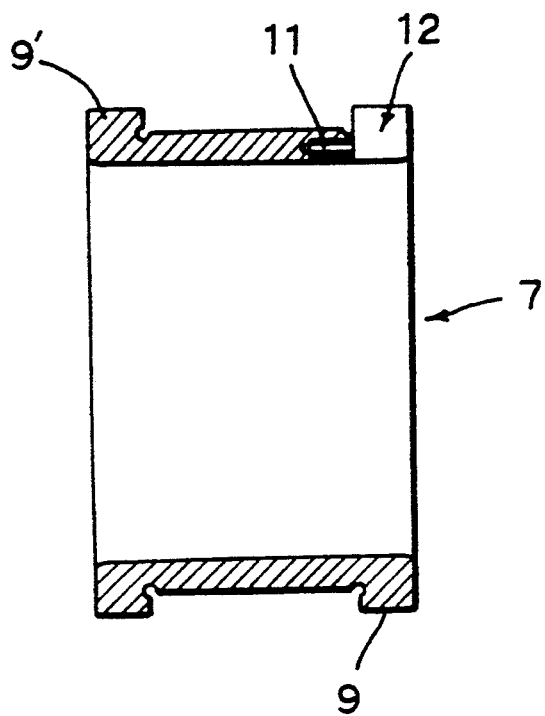
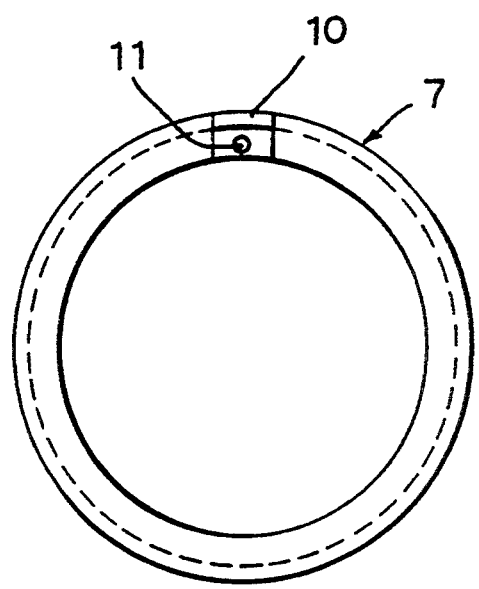
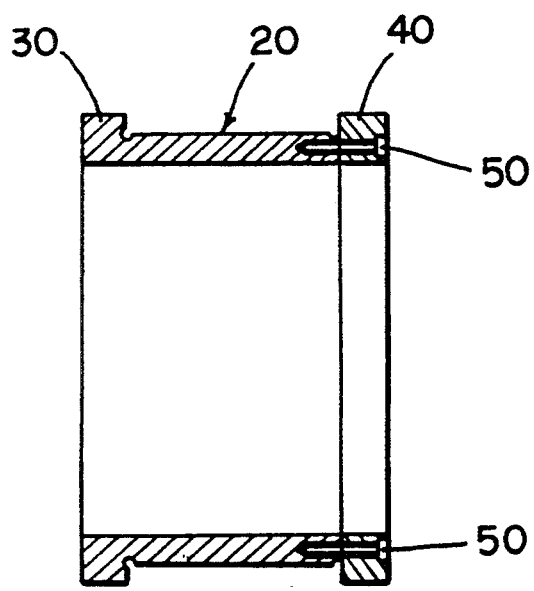

SELF-ALIGNING LOCATING TYPE ROLLER BEARING

FIELD OF THE INVENTION

The present invention relates to a self-aligning type roller bearing, and particularly, to a collar of an inner race of a self-aligning Locating type roller bearing, which includes an outer shell, an outer race coupled with the outer shell, an inner race coupled with the outer race, and a plurality of rollers disposed between the outer race and the inner race to prevent harmful slipping of the inner race relative to the outer race, and in which a part of the collar of the inner race is cut out to insert the rollers through the cut-out opening. After the assembling of the rollers, the cut-out portion is closed with a block, and consequently, the bearing can bear the axial load without generating distress, as well as enhancing the positional stability of the bearing, and making the rolling motion of the bearing more efficient.

BACKGROUND OF THE INVENTION

As shown in FIG. 6, the conventional bearing with a collar formed on the inner race 20 is constituted such that a collar 30 is integrally provided on one side of the inner race 20, and a separate piece 40 is attached on the other side of the inner race 20, after assembling the rollers.

That is, the separate piece 40 have the shape of a ring, and a plurality of screw holes are formed around its plane portion, while the inner race is also provided with a plurality of screw holes so as to be fastened with the separate piece. Thus the separate piece 40 is coupled with the inner race 20 by means of a plurality of bolts 50.

That is, first a plurality of rollers are assembled on the inner race 20, and then, the separate piece 40 is attached to the inner race 20 by means of the bolts 50. However, if the bearing is fitted to a shaft, and if the inner race 20 is subjected to a load in the axial direction, the bolts 50 can be loosened to give adverse effect to the normal function of the bearing, and to lead to the ultimate destruction of the bearing.

Further, the separate piece 40 performing the function of a collar can be attached to the inner race 20 only by providing a plurality of screw holes both on the separate piece 40 and on the inner race 20. The screw holes require a high precision, and therefore, the manufacturing cost is increased.

SUMMARY OF THE INVENTION

The present invention is intended to overcome the above described disadvantages of the conventional techniques.

Therefore, it is the object of the present invention to provide a self-aligning Locating type roller bearing in which collars are integrally provided to the both sides of the inner race, and, at the same time, the rollers can be assembled in an easy manner.

In achieving the above object, a part of one of the collars is cut out, a plurality of rollers are assembled through the cut-out opening, and then, the opening is closed with a block. Thus the assembling of the Bearing is facilitated, and, when the bearing is subjected to a load in the axial direction during an operation, the collar cannot be separated from the inner race.

BRIEF DESCRIPTION OF THE DRAWINGS

The above object and other advantages of the present invention will become more apparent by describing in detail the preferred embodiment of the present invention with reference to the attached drawings in which:

FIG. 4 is a longitudinal sectional view of the inner race of the bearing according to the present invention;

FIG. 5 is a frontal view of the inner race of the bearing according to the present invention; and FIG. 6 is a longitudinal sectional view of the inner race of the conventional bearing.

DESCRIPTION OF THE PREFERRED EMBODIMENT

Figure 1:
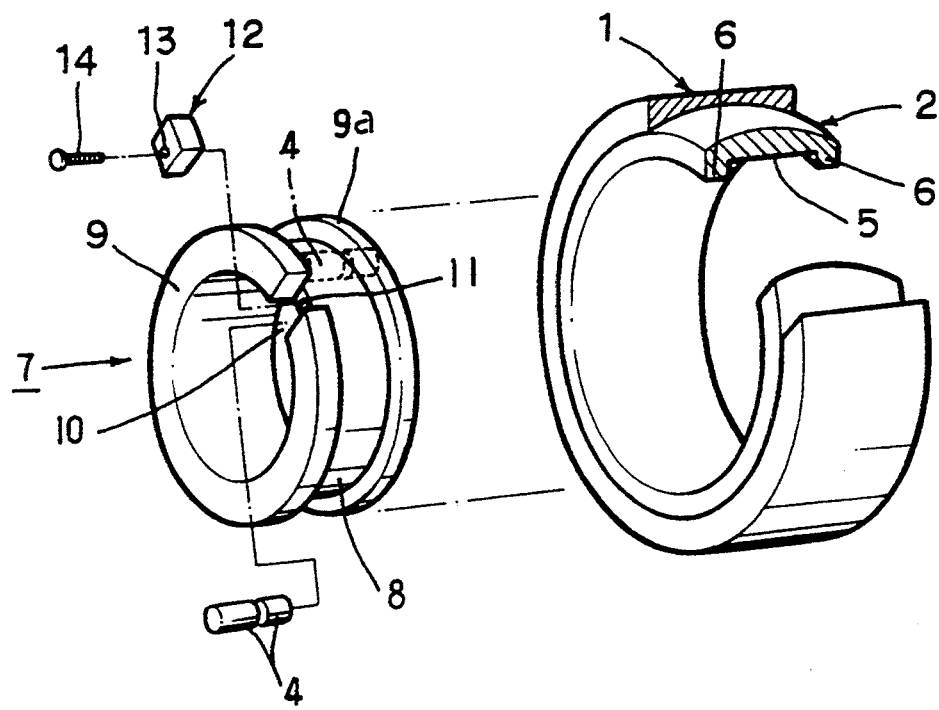
FIG. 1 is a partly cut-out perspective view of the self aligning type roller bearing according to the present invention.
Figure 2:
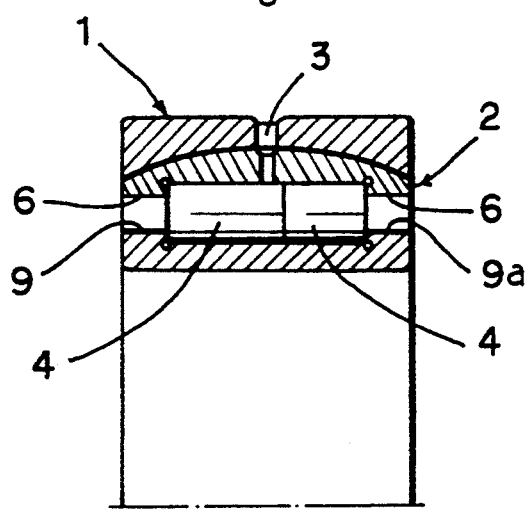
FIG. 2 is a sectional view showing a critical portion of the coupled state of the bearing of FIG. 1.

As shown in FIG. 1, an outer shell 1 having a spherical inner face is coupled with an outer race 2 having a spherical outer face, while both the outer shell 1 and the outer race 2 are provided with an oil injection passage 3.

The outer race 2 includes on its inner face a driving part 5 for driving rollers 4, while collars 6 having a certain height are formed at the edges of the driving part 5.

Now an inner race 7 which is coupled with the outer race 2 to accommodate a plurality of rollers 4 between them will be described.

The inner race 7 includes a roller driving part 8 along the middle portion of the outer circumference of it, and, at the edges of the driving part 8, there are formed collars 9 and 9a for supporting the ends of the rollers 4 in a rolling contact.

One of the collars 9 and 9a is cut out so as to insert the rollers 4 through it, thereby forming a roller insertion slot 10. Further, a fastening hole 11 is formed on the side wall of the inner race as shown in FIG. 1. Then a block 12 which is fit to the roller insertion slot 10 is formed, and a through hole is formed through the block 12. The fastening hole 11 of the roller insertion slot 10 and the screw hole 13 of the block 12 are aligned together so as to fasten the block 12 into the roller insertion slot 10.

Thus the block 12 can be assembled into the roller insertion slot 10 by aligning the screw hole 11 and the through hole 13, and by driving a bolt 14 through the holes, thereby completing the assembling of the inner race 7.

That is, as shown in FIGS. 4 and 5, the cut-out portion, i.e., the roller insertion slot 10, is firmly closed by means of the block 12. Therefore, when a load is imposed in the axial direction, the rollers are securely supported by the collars, because the integral portions of the collars are very wide. Consequently, the rolling motions of the rollers are rendered very efficient even under a heavy load, as well as extending the life expectancy of the bearing.

Figure 3:
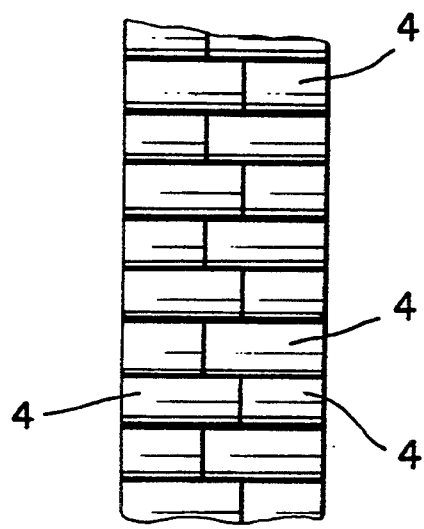
FIG. 3 illustrates the arrangement of the rollers for the bearing of the present invention.

As shown in FIG. 3, the arrangement of the rollers 4 is made such that longer and shorter rollers are alternately disposed in a zig-zag type between the outer race 2 and the inner race 7. In this arrangement of the rollers 4, the axial load and thermal expansions are taken into account.

Now the self-aligning Locating type roller bearing according to the present invention will be described as to its action and effect.

As shown in FIG. 1, a part of the collar 9 is cut out to form the roller insertion slot 10, and the rollers 4 are inserted into between the outer race 2 and the inner race 7 so as for the rollers 4 to be disposed in the driving parts 5 and 8. After assembling the last of the rollers 4, the block 12 is assembled into the roller insertion slot 10 by driving a fastening bolt 14 through the screw hole 11 and through the through hole 13, thereby completing the assembling of the bearing.

The block 12 serves as a part of the collar 9 of the inner race 7 to guide and support the rollers between the outer race 2 and the inner race 7.

The block 12 of the collar 9 of the inner race 7 performs guiding and supporting functions in cooperation with the corresponding part of the collar 9a of the inner race 7. Therefore, when the inner race 7 is let to revolve with the outer race 2 kept stationary, and when the bearing is subjected to an axial load, the elastic deformation and thermal deformations due to the temperature difference between the different parts of the bearing can be kept to the minimum. Under even a heavy axial load, the integral collars 9 and 9a firmly supports the rollers 4, and therefore, the rolling motions of the rollers cannot be impeded, which is liable to occur in the conventional bearing due to the loosening of the separate collar. Consequently, the prevention of the damages of the bearing is assured, and the life expectancy of the bearing is extended.

If the self-aligning Locating type roller bearing according to the present invention is applied to continuous casting facility, iron rolling facility, paper manufacturing facility, various conveyors, various fans, dryers, and other industrial machines, the life expectancy of the facilities can be extended.

What is claimed is:

1. A self-aligning Locating type roller bearing comprising: an outer shell having a spherical inner face; an outer race having a spherical outer face and coupled with said outer shell; an inner race having two integral collars, and coupled with said outer race; and a plurality of rollers disposed between said outer race and said inner race, said bearing further comprising:
 a roller insertion slot formed by cutting out a part of one of said collars to assemble said rollers through said roller insertion slot; and
 a block for being fastened into said roller insertion slot by driving a bolt through a through hole of said block and a screw hole formed on said inner race, the fastening of said block into said roller insertion slot being performed after assembling of said rollers through said roller insertion slot.

2. The self-aligning Locating type roller bearing as claimed in claim 1, wherein said through hole of said block is aligned with said screw hole formed on said inner race.

3. The self-aligning Locating type roller bearing as claimed in any one of claims 1, wherein the shape of said block is same as that of said roller insertion slot.

* * * * *